US011636055B2

(12) United States Patent
Chen et al.

(10) Patent No.: US 11,636,055 B2
(45) Date of Patent: Apr. 25, 2023

(54) METHOD AND APPARATUS FOR PERFORMING ACCESS MANAGEMENT OF MEMORY DEVICE IN PREDETERMINED COMMUNICATIONS ARCHITECTURE WITH AID OF FLEXIBLE DELAY TIME CONTROL

(71) Applicant: Silicon Motion, Inc., Hsinchu County (TW)

(72) Inventors: Wen-Shu Chen, Taipei (TW); Kuo-Cyuan Kuo, Hsinchu County (TW); I-Ta Chen, New Taipei (TW); Chih-Chiang Chen, Taichung (TW)

(73) Assignee: Silicon Motion, Inc., Hsinchu County (TW)

( * ) Notice: Subject to any disclaimer, the term of this patent is extended or adjusted under 35 U.S.C. 154(b) by 100 days.

(21) Appl. No.: 17/475,366

(22) Filed: Sep. 15, 2021

(65) Prior Publication Data

US 2023/0012997 A1    Jan. 19, 2023

Related U.S. Application Data

(60) Provisional application No. 63/221,925, filed on Jul. 14, 2021.

(51) Int. Cl.
*G06F 13/16* (2006.01)

(52) U.S. Cl.
CPC .................. *G06F 13/1668* (2013.01)

(58) Field of Classification Search
None
See application file for complete search history.

(56) References Cited

U.S. PATENT DOCUMENTS

| 8,688,899 | B2* | 4/2014 | Nellans | G11C 11/40615 |
| | | | | 711/103 |
| 2018/0242319 | A1* | 8/2018 | Akkarakaran | H04L 5/0053 |
| 2019/0317680 | A1 | 10/2019 | Elhamias | |
| 2021/0103407 | A1 | 4/2021 | Na | |

FOREIGN PATENT DOCUMENTS

| CN | 109284241 A | 1/2019 |
| TW | 201800929 A | 1/2018 |
| TW | 201818257 A | 5/2018 |
| WO | 2020/062734 A1 | 4/2020 |

* cited by examiner

*Primary Examiner* — Michael Sun
(74) *Attorney, Agent, or Firm* — Winston Hsu

(57) ABSTRACT

A method for performing access management of a memory device in predetermined communications architecture with aid of flexible delay time control and associated apparatus are provided. The method may include: utilizing at least one upper layer controller of a transmission interface circuit within the memory controller to dynamically set a delay parameter regarding transmission from the memory device to a host device, for preventing sleeping in delay time(s) corresponding to the delay parameter; utilizing a physical layer (PHY) circuit of the transmission interface circuit to transmit first data from the memory device to the host device, wherein a first delay time starts from a first time point at which transmitting the first data from the memory device to the host device is completed; and utilizing the PHY circuit to start transmitting second data from the memory device to the host device in the first delay time without restarting from sleeping.

18 Claims, 6 Drawing Sheets

METHOD AND APPARATUS FOR PERFORMING ACCESS MANAGEMENT OF MEMORY DEVICE IN PREDETERMINED COMMUNICATIONS ARCHITECTURE WITH AID OF FLEXIBLE DELAY TIME CONTROL

CROSS REFERENCE TO RELATED APPLICATIONS

This application claims the benefit of U.S. provisional application No. 63/221,925, which was filed on Jul. 14, 2021, and is included herein by reference.

BACKGROUND OF THE INVENTION

1. Field of the Invention

The present invention is related to memory control, and more particularly, to a method and apparatus for performing access management of a memory device in a predetermined communications architecture with aid of flexible delay time control.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. When a manufacture tries to enhance some features of the memory device according to MIPI UniPro specification, some problems may occur. More particularly, the memory device may operate in a certain automatic communications mode, but in some situations, a communications speed between the memory device and a host device may decrease (e.g. due to the host device or some other reasons), causing the overall performance to be reduced. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing access management of a memory device in a predetermined communications architecture (e.g. a MIPI UniPro communications architecture) with aid of flexible delay time control, in order to solve the above-mentioned problems.

At least one embodiment of the present invention provides a method for performing access management of a memory device in a predetermined communications architecture with aid of flexible delay time control, the method can be applied to a memory controller of the memory device. The memory device may comprise the memory controller and a non-volatile (NV) memory, and the NV memory may comprise at least one NV memory element (e.g. one or more NV memory elements). The method may comprise: utilizing at least one upper layer controller of a transmission interface circuit within the memory controller to dynamically set a delay parameter regarding transmission from the memory device to a host device, for preventing sleeping in at least one delay time corresponding to the delay parameter, wherein the delay parameter is dynamically set as one of multiple predetermined values, rather than being set as a single fixed value; utilizing a physical layer (PHY) circuit of the transmission interface circuit to transmit first data from the memory device to the host device, wherein a first delay time measured with respect to the first data among the at least one delay time starts from a first time point at which transmitting the first data from the memory device to the host device is completed; and utilizing the PHY circuit to start transmitting second data from the memory device to the host device in the first delay time without restarting from sleeping.

In addition to the above method, the present invention also provides a memory device, and the memory device comprises a NV memory and a controller. The NV memory is arranged to store information, wherein the NV memory may comprise at least one NV memory element (e.g. one or more NV memory elements). The controller is coupled to the NV memory, and the controller is arranged to control operations of the memory device. In addition, the controller comprises a processing circuit that is arranged to control the controller according to a plurality of host commands from a host device, to allow the host device to access the NV memory through the controller. The controller further comprises a transmission interface circuit, and the transmission interface circuit is arranged to perform communications with the host device, and more particularly, comprises a physical layer (PHY) circuit and at least one upper layer controller. The PHY circuit is arranged to perform transmitting and receiving operations for the transmission interface circuit. The at least one upper layer controller is arranged to control operations of the PHY circuit according to a predetermined specification. For example, the controller utilizes the at least one upper layer controller to dynamically set a delay parameter regarding transmission from the memory device to the host device, for preventing sleeping in at least one delay time corresponding to the delay parameter, wherein the delay parameter is dynamically set as one of multiple predetermined values, rather than being set as a single fixed value; the controller utilizes the PHY circuit to transmit first data from the memory device to the host device, wherein a first delay time measured with respect to the first data among the at least one delay time starts from a first time point at which transmitting the first data from the memory device to the host device is completed; and the controller utilizes the PHY circuit to start transmitting second data from the memory device to the host device in the first delay time without restarting from sleeping.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a controller of a memory device, where the memory device comprises the controller and a NV memory. The NV memory may comprise at least one NV memory element (e.g. one or more NV memory elements). In addition, the controller comprises a processing circuit that is arranged to control the controller according to a plurality of host commands from a host device, to allow the host device to access the NV memory through the controller. The controller further comprises a transmission interface circuit, and the transmission interface circuit is arranged to perform communications with the host device, and more particularly, comprises a physical layer (PHY) circuit and at least one upper layer controller. The PHY circuit is arranged to perform transmitting and receiving operations for the transmission interface circuit. The at least one upper layer controller is arranged to control operations of the PHY circuit according to a predetermined specification. For example, the controller utilizes the at least one upper layer controller to dynamically set a delay parameter regarding transmission from the memory device to the host device, for preventing sleeping in at least one delay time corresponding to the delay parameter, wherein the delay parameter is dynamically set as one of multiple predetermined values, rather than being set as a single fixed value; the controller utilizes the PHY circuit to transmit first data from the memory device to the host device, wherein a first delay time measured with respect to the first data among the at least one delay time starts from a first time point at which transmitting the first data from the memory device to the host device is completed; and the controller utilizes the PHY circuit to start transmitting second data from the memory device to the host device in the first delay time without restarting from sleeping.

According to some embodiments, the memory controller of the memory device may control the operations of the memory device according to the method, and the memory device may be installed in the electronic device. The apparatus may comprise at least one portion (e.g. a portion or all) of the electronic device. For example, the apparatus may comprise the memory controller within the memory device. In another example, the apparatus may comprise the memory device. In yet another example, the apparatus may comprise the whole of the electronic device.

According to some embodiments, in order to enhance the performance of the memory device, it is suggested that the memory device may dynamically set the delay parameter regarding the transmission from the memory device to the host device, and more particularly, dynamically set the delay parameter according to a selected communications speed (e.g. the communications speed of a selected communications speed mode) among multiple predetermined communications speeds (e.g. the respective communications speeds of multiple predetermined communications speed modes), where the selected communications speed is selected from the multiple predetermined communications speeds. According to some embodiments, the memory device can be configured to dynamically set the delay parameter to make all of multiple delay time lengths respectively corresponding to the multiple predetermined communications speeds be equal to a predetermined delay time length.

The present invention method and apparatus can guarantee that the memory device can operate properly in various situations. For example, the memory device can dynamically set the delay parameter (e.g. an end-of-burst (EoB) delay parameter) to temporarily prevent a transmitter of the PHY circuit from entering an idle state according to an upper level information (e.g. system level information) of the memory device, and therefore can enhance the overall performance. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
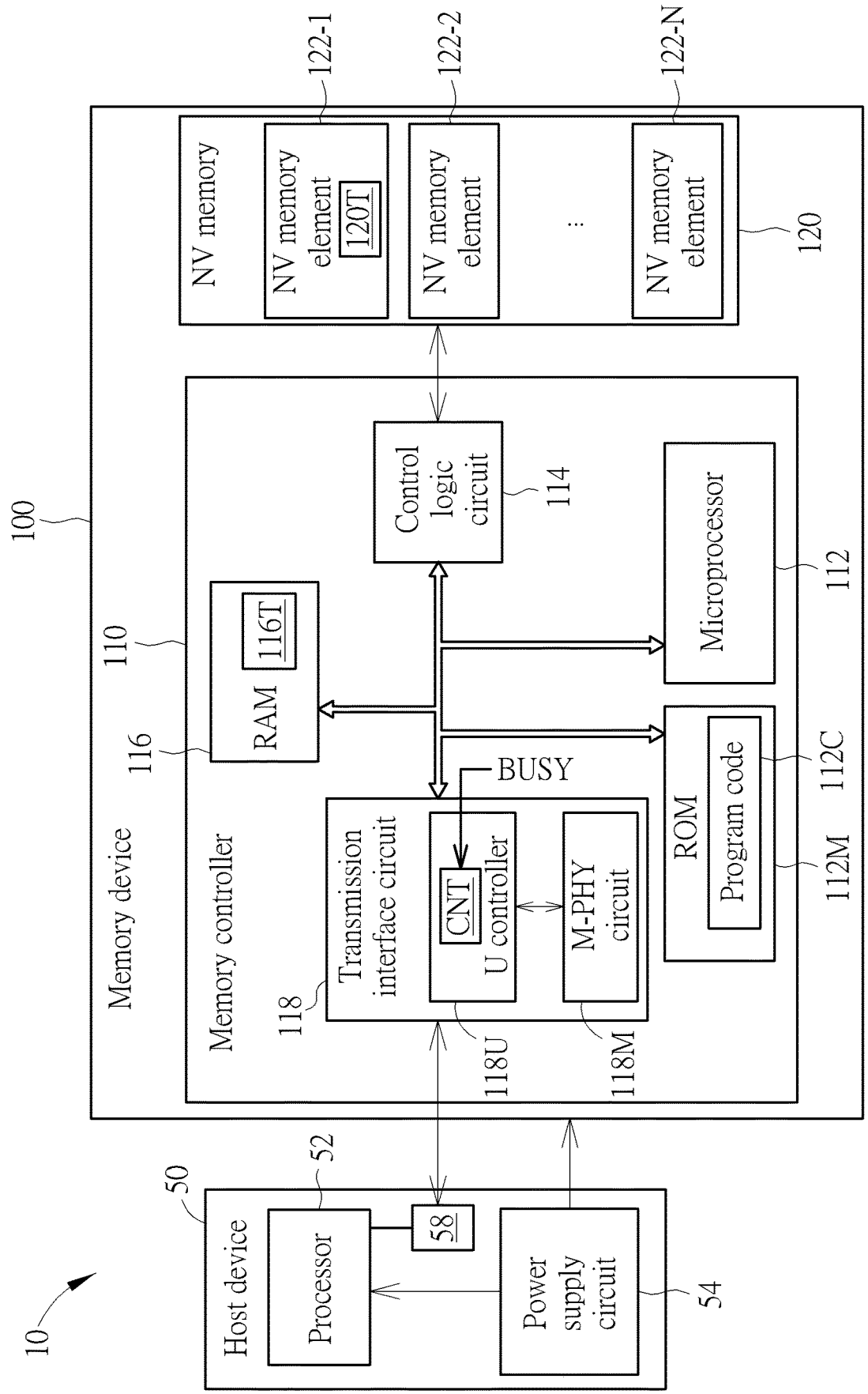
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g. one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g. a memory card conforming to the SD/MMC, CF, MS or XD specification), a solid state drive (SSD), and various types of embedded memory devices (e.g. an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAM 116 (which may be implemented by way of SRAM, for example), and a transmission interface circuit 118, where at least one portion (e.g. a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may comprise multiple sub-circuits, which may interact with each other to perform communications. The transmission interface circuit 118 may conform to one or more communications specifications among various communications specifications (e.g. the Serial Advanced Technology Attachment (SATA) specification, Universal Serial Bus (USB) specification, Peripheral Component Interconnect Express (PCIe) specification, embedded Multi Media Card (eMIVIC) specification, and Universal Flash Storage (UFS) specification), and may perform communications with the host device 50 (e.g. the transmission interface circuit 58) according to the one or more communications specifications for the memory device 100. Similarly, the transmission interface circuit 58 may conform to the one or more communications specifications, and may perform communications with the memory device 100 (e.g. the transmission interface circuit 118) according to the one or more communications specifications for the host device 50. For example, the multiple sub-circuits of the transmission interface circuit 118 may comprise a physical layer (PHY) circuit such as a MIPI-PHY (M-PHY) circuit 118M, and at least one upper layer (U) controller (e.g. one or more upper layer controllers) which may be collectively referred to as the upper layer controller 118U (labeled "U controller" for brevity), and the transmission interface circuit 58 may be implemented to have a circuitry architecture (e.g. multiple corresponding sub-circuits) similar to or the same as that of the transmission interface circuit 118.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses. The NV memory 120 may store a global L2P address mapping table 120T, for the memory controller 110 to control the memory device 100 to access data in the NV memory 120.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the local L2P address mapping tables may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g. a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table 116T which is stored as the temporary L2P address mapping table 116T, but the present invention is not limited thereto.

In addition, the aforementioned at least one NV memory element (e.g. the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, N]) within the NV memory elements 122-1, 122-2, . . . , and 122-N, may comprise multiple blocks, and a block within the multiple blocks may comprise and record a specific number of pages, where the memory controller 110 may access a certain page of a certain block within the multiple blocks according to a block address and a page address. For another example, the NV memory element 122-n may comprise multiple planes, where a plane may comprise a set of blocks such as the aforementioned multiple blocks, and the memory controller 110 may specify a certain plane within the multiple planes according to a plane number, to access a certain page of a certain block of this plane. As the total number of blocks increases, the storage space of the NV memory 120 may become larger. Regarding manufacturing the NV memory 120, many technologies may be utilized, for example: a 2D/planar NAND flash technology, which may arrange memory cells into a single layer; and a 3D NAND flash technology, which may arrange the memory cells into a vertical stack of multiple layers. According to some embodiments, the NV memory 120 may be implemented as a 2D/planar NAND flash structure with the memory cells arranged in a single layer. According to some embodiments, the NV memory 120 may be implemented as a 3D NAND flash structure with multiple layers of memory cells stacked vertically. In this situation, the storage space of the NV memory 120 may become very large.

Figure 2:
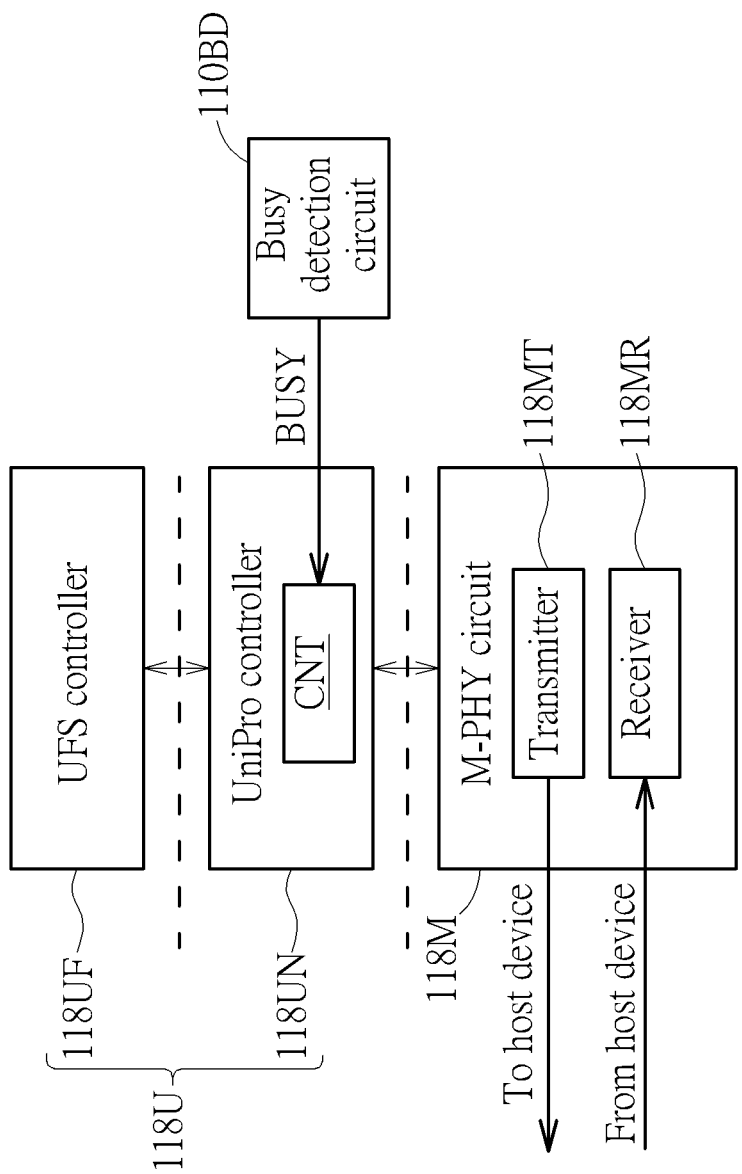
FIG. 2 illustrates a busy-aware delay control scheme of a method for performing access management of a memory device such as that shown in FIG. 1 in a predetermined communications architecture with aid of flexible delay time control according to an embodiment of the present invention.

FIG. 2 illustrates a busy-aware delay control scheme of a method for performing access management of a memory device such as that shown in FIG. 1 in a predetermined communications architecture (e.g. a MIPI UniPro communications architecture) with aid of flexible delay time control according to an embodiment of the present invention. The method can be applied to the architecture shown in FIG. 1, for example, the electronic device 10, the memory device 100, and the memory controller 110, and more particularly, the components within the memory controller 110, such as the microprocessor 112, the transmission interface circuit 118, etc. For better comprehension, the transmission interface circuit 118 may be logically divided into multiple layers, and the physical layer (PHY) of the PHY circuit (e.g. the M-PHY circuit 118M) in the transmission interface circuit 118 may be regarded as a bottom layer. For example, the aforementioned at least one upper layer controller such as the upper layer controller 118U may comprise multiple upper layer controllers respectively corresponding to multiple upper layers, such as a Unipro controller 118UN and a UFS controller 118UF, where the M-PHY circuit 118M may correspond to the bottom layer below the upper layers.

As shown in FIG. 2, the M-PHY circuit 118M may comprise a transmitter 118MT and a receiver 118MR, and the UniPro controller 118UN may comprise a counter CNT. The M-PHY circuit 118M may perform operations of the physical layer according to a clock generated by a phase-locked loop (PLL) therein (not shown), and more particularly, may utilize the transmitter 118MT and the receiver 118MR to transmit information such as data, etc. to the host device 50 (e.g. the transmission interface circuit 58) and receive information such as data, etc. from the host device 50 (e.g. the transmission interface circuit 58), respectively. In addition, the UniPro controller 118UN may control operations of the M-PHY circuit 118M according to the MIPI UniPro specification, and more particularly, may utilize the counter CNT to count a counter value related to a delay time according to a delay parameter such as an end-of-burst (EoB) delay parameter EoB_Delay(SPEED). For example, the counter CNT may perform count down operations, starting from a predetermined initial counter value such as the value of the EoB delay parameter EoB_Delay(SPEED), and when the counter value of the counter CNT reaches zero, which may indicate that a predetermined delay time corresponding to the EoB delay parameter EoB_Delay(SPEED) is expired, the UniPro controller 118UN may control the transmitter 118MT in the M-PHY circuit 118M to stop transmission, where the burst close timing can be delayed by the predetermined delay time corresponding to the EoB delay parameter EoB_Delay(SPEED). Please note that the delay parameter such as the EoB delay parameter EoB_Delay(SPEED) can be adjustable with respect to a communications speed SPEED between the host device 50 and the memory device 100. For example, this adjustment of the EoB delay parameter EoB_Delay(SPEED) can be performed under control of the processing circuit such as the microprocessor 112, but the present invention is not limited thereto.

The architecture shown in FIG. 2 is helpful on dealing with the related art problems. For example, the memory device 100 may operate in a certain automatic communications mode such as a fast-auto mode FastAuto_Mode. In the memory device 100, the memory controller 110 (e.g. the microprocessor 112, the transmission interface circuit 118, the UniPro controller 118UN, and/or the UFS controller 118UF) can dynamically set the delay parameter such as the EoB delay parameter EoB_Delay(SPEED) to temporarily prevent the transmitter 118MT of the M-PHY circuit 118M from entering an idle state according to the communications speed SPEED and/or according to an upper level information (e.g. system level information) of the memory device 100, and therefore can enhance the overall performance. For example, the memory controller 110 may further comprise a busy detection circuit 110BD arranged to generate a busy signal BUSY. When the busy signal BUSY indicates that at least one component (e.g. one or more components) among multiple predetermined components within the memory controller 110 is busy or in a busy state, and more particularly, needing to transmit more information such as more data, one or more responses, etc. from the memory device 100 to the host device 50 via the M-PHY circuit 118M (e.g. the transmitter 118MT), the counter CNT can temporarily stop counting (e.g. temporarily stop performing count down). Thus, when there is a need (e.g. the aforementioned at least one component needs to perform transmission from the memory device 100 to the host device 50 via the transmitter 118MT), the memory controller 110 can further postpone the delay of the burst close until the busy signal BUSY indicates that none of the multiple predetermined components is busy or in the busy state.

Based on the architecture shown in FIG. 2, the present invention method and apparatus can solve the related art problems without introducing any side effect or in a way that is less likely to introduce a side effect.

Figure 3:
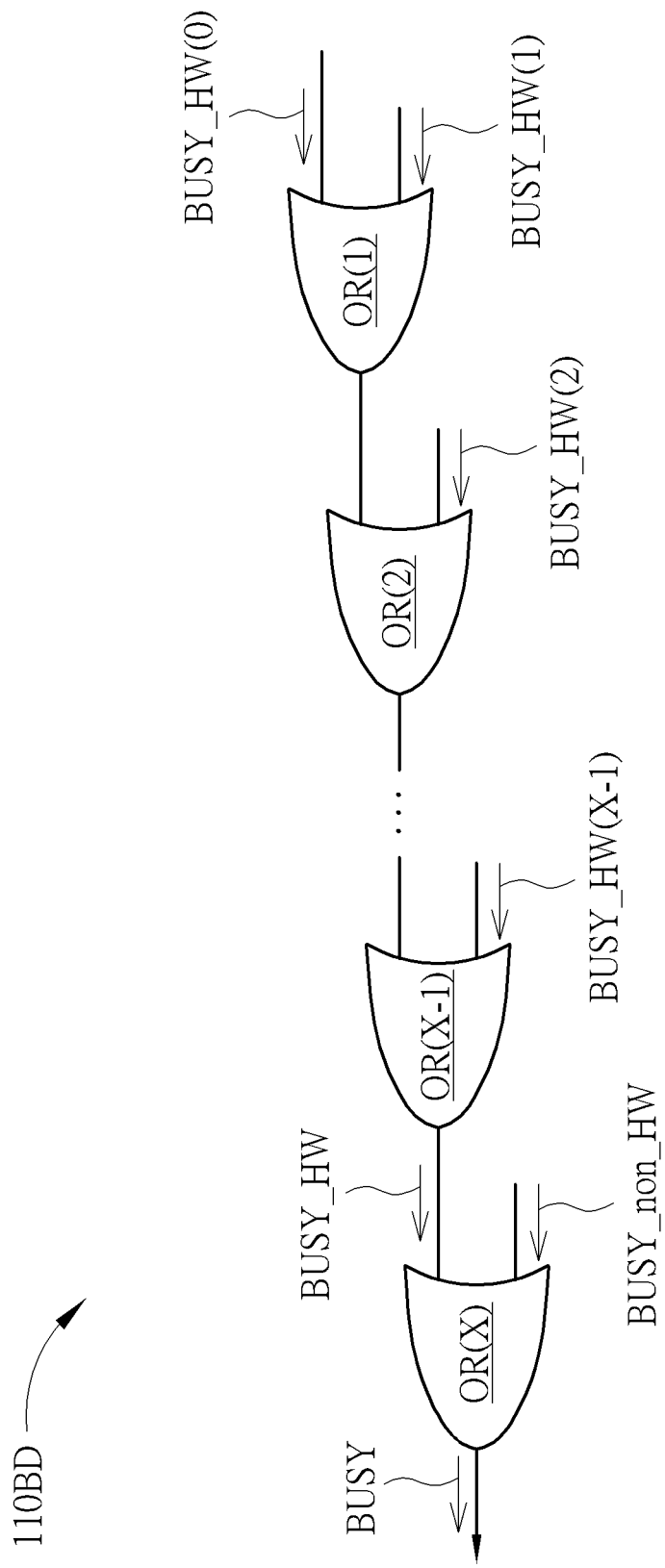
FIG. 3 illustrates some implementation details of the busy-aware delay control scheme shown in FIG. 2 according to an embodiment of the present invention.

FIG. 3 illustrates some implementation details of the busy-aware delay control scheme shown in FIG. 2 according to an embodiment of the present invention. The busy detection circuit 110BD may comprise a plurality of OR gates such as the OR gates OR(1), OR(2), OR(X−1) and OR(X). As shown in FIG. 3, the OR gates OR(1), OR(2), OR(X−1) and OR(X) can be arranged to receive multiple input signals such as multiple hardware busy signals BUSY_HW(0), BUSY_HW(1), . . . and BUSY_HW(X−1) and a non-hardware busy signal BUSY_non_HW, and perform OR operations on the multiple hardware busy signals BUSY_HW(0), BUSY_HW(1), . . . and BUSY_HW(X−1) and the non-hardware busy signal BUSY_non_HW to generate the busy signal BUSY. For better comprehension, the multiple hardware busy signals BUSY_HW(0), BUSY_HW(1), . . . and BUSY_HW(X−1) may be sent from the multiple predetermined components, for indicating whether the multiple predetermined components are busy or in the busy state (e.g. the multiple predetermined components need to perform transmission from the memory device 100 to the host device 50 via the transmitter 118MT), respectively, and the non-hardware busy signal BUSY_non_HW may be sent from the microprocessor 112 running the program code 112C, for indicating whether the microprocessor 112 running the program code 112C is busy or in the busy state (e.g. the microprocessor 112 running the program code 112C needs to perform transmission from the memory device 100 to the host device 50 via the transmitter 118MT). When any input signal among these input signals indicates the busy state (e.g. the logical value 1), the busy signal BUSY may indicate the busy state (e.g. the logical value 1). When all of these input signals indicate a non-busy state (e.g. the logical value 0), the busy signal BUSY may indicate the non-busy state (e.g. the logical value 0). For brevity, similar descriptions for this embodiment are not repeated in detail here.

Figure 4:
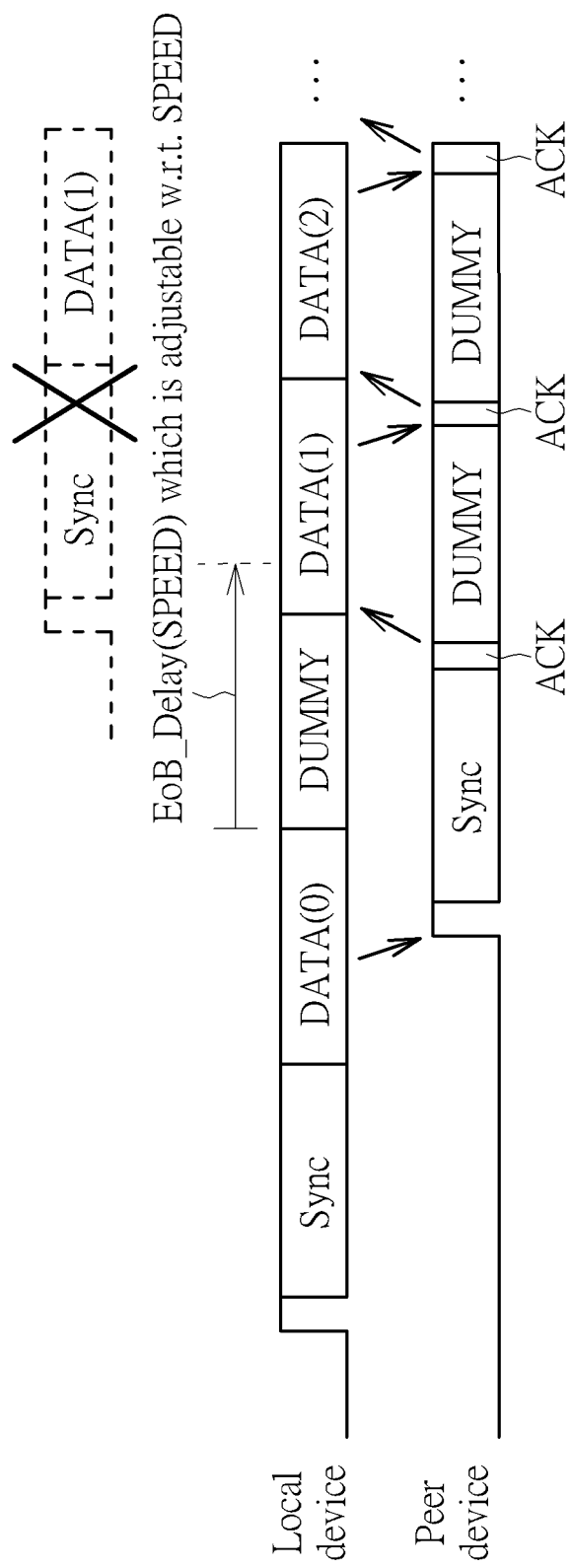
FIG. 4 illustrates a flexible delay control scheme of the method for performing access management of the memory device in the predetermined communications architecture with aid of flexible delay time control according to an embodiment of the present invention.

FIG. 4 illustrates a flexible delay control scheme of the method for performing access management of the memory device in the predetermined communications architecture with aid of flexible delay time control according to an embodiment of the present invention. For better comprehension, a local device and a peer device in the predetermined communications architecture such as the MIPI UniPro communications architecture may represent the memory device 100 and the host device 50, respectively, but the present invention is not limited thereto. According to some embodiments, the memory device 100 and the host device 50 may exchange their roles in the predetermined communications architecture such as the MIPI UniPro communications architecture, which means the local device and the peer device may represent the host device 50 and the memory device 100, respectively, where the method can also be applied to the host device 50.

In the automatic communications mode such as the fast-auto mode FastAuto_Mode, the local device such as the memory device 100 may utilize the M-PHY circuit 118M (e.g. the transmitter 118MT) to send predetermined information such as synchronization information Sync and data DATA(0) to the peer device such as the host device 50, and wait for a delay time that is less than or equal to the predetermined delay time corresponding to the EoB delay parameter EoB_Delay(SPEED), and more particularly, wait for a response from the host device 50 rather than immediately trigger the burst close (e.g. the EoB), for preventing related art problems such as the decreased speed problem due to additional synchronization information Sync (labeled "X" thereon for indicating that the additional synchronization information Sync illustrated with dashed lines does not exist in the flexible delay control scheme and will not delay the transmission of the data DATA(1)). For example, the memory device 100 may utilize the M-PHY circuit 118M (e.g. the transmitter 118MT) to send dummy data DUMMY to the host device 50 during the delay time. When the host device 50 sends the predetermined information such as the synchronization information Sync and acknowledgement information ACK to the memory device 10, which may indicate that triggering the burst close such as the EoB at this moment is unnecessary, the memory device 100 may utilize the M-PHY circuit 118M (e.g. the transmitter 118MT) to send subsequent data such as data DATA(1), DATA(2), etc., where the host device 50 may send its own dummy data DUMMY and subsequent acknowledgement information ACK to the memory device 10 correspondingly.

As shown in FIG. 4, the memory controller 110 can control the delay parameter such as the EoB delay parameter EoB_Delay(SPEED) to be adjustable with respect to the communications speed SPEED between the host device 50 and the memory device 100 (labeled "EoB_Delay(SPEED) which is adjustable w.r.t. SPEED" for brevity), and more particularly, can dynamically adjust the delay parameter such as the EoB delay parameter EoB_Delay(SPEED) according to the communications speed SPEED. For brevity, similar descriptions for this embodiment are not repeated in detail here.

According to some embodiments, the memory controller 110 can operate in a High Speed (HS) mode, and can select a speed from the respective speeds of HS-Gear 1 (HS-G1), HS-Gear 2 (HS-G2), HS-Gear 3 (HS-G3), HS-Gear 4 (HS-G4) and HS-Gear 5 (HS-G5) to be the communications speed SPEED. For a set of predetermined configurations, a predetermined bit width of the M-PHY circuit 118M can be equal to the bit width of 40 bits, and the memory controller 110 can dynamically adjust the delay parameter such as the EoB delay parameter EoB_Delay(SPEED) according to the communications speed SPEED as follows:

(1) when the communications speed SPEED is the speed of HS-G1 (e.g. the symbol clock can be equal to 37.5 Megahertz (MHz)), the memory controller 110 can set the counter value to be equal to 100 (e.g. EoB_Delay(SPEED)=100), for indicate that the predetermined delay time is equal to 100 Symbol Interval (SI);

(2) when the communications speed SPEED is the speed of HS-G2 (e.g. the symbol clock can be equal to 75 MHz), the memory controller 110 can set the counter value to be equal to 200 (e.g. EoB_Delay(SPEED)=200), for indicate that the predetermined delay time is equal to 200 SI;

(3) when the communications speed SPEED is the speed of HS-G3 (e.g. the symbol clock can be equal to 150 MHz), the memory controller 110 can set the counter value to be equal to 400 (e.g. EoB_Delay(SPEED)=400), for indicate that the predetermined delay time is equal to 400 SI;

(4) when the communications speed SPEED is the speed of HS-G4 (e.g. the symbol clock can be equal to 300 MHz), the memory controller 110 can set the counter value to be equal to 800 (e.g. EoB_Delay(SPEED)=800), for indicate that the predetermined delay time is equal to 800 SI; and (5) when the communications speed SPEED is the speed of HS-G5 (e.g. the symbol clock can be equal to 600 MHz), the memory controller 110 can set the counter value to be equal to 1600 (e.g. EoB_Delay(SPEED)=1600), for indicate that the predetermined delay time is equal to 1600 SI; where the memory controller 110 can perform the above settings to make the predetermined delay time be equal to a predetermined absolute time length, but the present invention is not limited thereto. For brevity, similar descriptions for these embodiments are not repeated in detail here.

According to some embodiments, the delay parameter such as the EoB delay parameter EoB_Delay(SPEED) and/or the associated parameters may vary. For example, the set of predetermined configurations may vary, and the EoB delay parameter EoB_Delay(SPEED) and/or the associated parameters may vary correspondingly. For brevity, similar descriptions for these embodiments are not repeated in detail here.

According to some embodiments, the memory controller 110 can dynamically adjust the delay parameter such as the EoB delay parameter EoB_Delay(SPEED) according to the communications speed SPEED to make the predetermined delay time be equal to the predetermined absolute time length such as 10 microseconds (μs) or any of other absolute time lengths. For brevity, similar descriptions for these embodiments are not repeated in detail here.

According to some embodiments, the memory controller 110 can dynamically adjust the delay parameter such as the EoB delay parameter EoB_Delay(SPEED) according to the communications speed SPEED, especially for Pulse-width modulation (PWM) speed (e.g. PWM-Gear 1 (PWM-G1), PWM-Gear 2 (PWM-G2), etc. of the PWM mode). For brevity, similar descriptions for these embodiments are not repeated in detail here.

Some implementation details regarding multiple cases of the at least one component being busy (or in the busy state) and needing to transmit the more information such as the more data, the one or more responses, etc. may be further described as follows. According to some embodiments, in the automatic communications mode such as the fast-auto mode FastAuto_Mode, the memory device 100 can detect any of the multiple cases and trigger the busy signal BUSY to indicate the busy state (e.g. the logical value 1), and more particularly, can perform one or more operations among the following operations:

(1) in a first case related to host write (e.g. the host device 50 sends a host write command to the memory device 100, for writing data into the memory device 100), all of the data to be written may be transferred to the memory device 100 (e.g. the memory controller 110), but the memory device 100 (e.g. the memory controller 110) may need to move the data to the NV memory 120 and check other information, in order to return a response to the host device 50, so during this period, the transmitter 118MT can continue operating, and will not stop or be turned off, where no sleeping and restarting will occur during this period;
(2) in a second case related to host read (e.g. the host device 50 sends a host read command to the memory device 100, for reading data from the memory device 100), although the transmitter 118MT can continue transmitting data, if the host buffer in the host device 50 is very small, it is possible that the acknowledge information ACK cannot be received by the host device 50 (e.g., this may be one the reasons causing the related art problems, where transmitting data cannot be continued and therefore the transmitter will be turned off), so during this period, the memory controller 110 can control the counter CNT to temporarily stop counting, to make the transmitter 118MT continue operating, without turning off the transmitter 118MT;
(3) in a third case related to host read, for example, when the host device 50 sends many host read commands to the memory device 100, for reading many data from the memory device 100, as the memory controller 110 is aware of all requests for reading many data, the memory controller 110 can control the counter CNT to temporarily stop counting, to make the transmitter 118MT continue operating, without turning off the transmitter 118MT, where during this period, the memory controller 110 can prepare the read data for the transmission interface circuit 118 (e.g. the UniPro controller 118UN and the M-PHY circuit 118M); and
(4) in a fourth case related to host write (e.g. the host device 50 sends a host write command to the memory device 100, for writing data into the memory device 100), when the data to be written is sent to the transmission interface circuit 118 (e.g. the M-PHY circuit 118M and the UniPro controller 118UN) from the host device 50, the memory device 100 typically needs to send the acknowledge information ACK to the host device 50, and sending the acknowledge information ACK to the host device 50 in time is typically required (e.g. failing to send the acknowledge information ACK in time may be one the reasons causing the related art problems), so the memory controller 110 can control the counter CNT to temporarily stop counting, to make the transmitter 118MT continue operating, without turning off the transmitter 118MT, and therefore can prevent the related art problems;
but the present invention is not limited thereto. For brevity, similar descriptions for these embodiments are not repeated in detail here.

Figure 5:
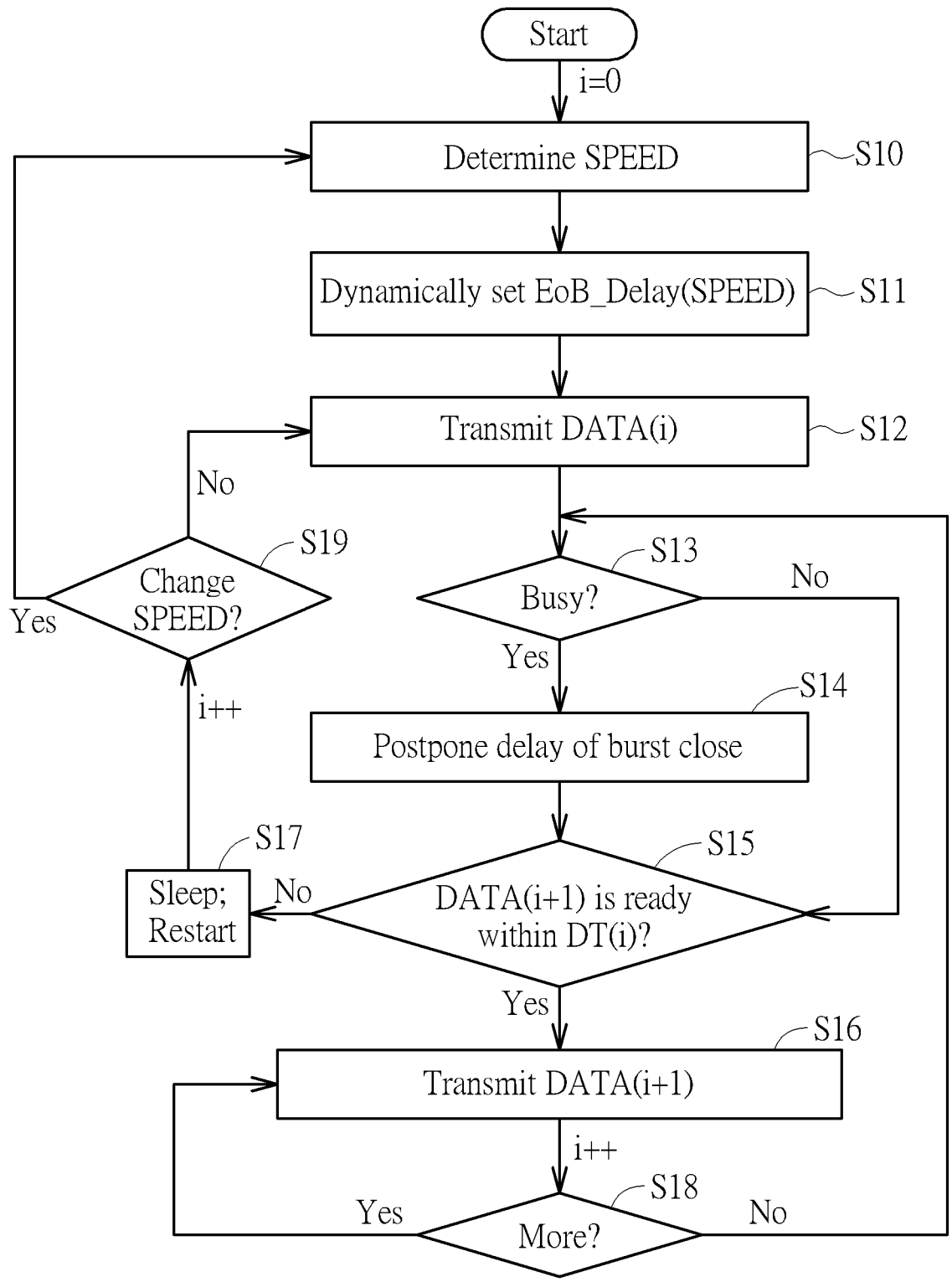
FIG. 5 is a flowchart of the method for performing access management of the memory device in the predetermined communications architecture with aid of flexible delay time control according to an embodiment of the present invention.

FIG. 5 is a flowchart of the method for performing access management of the memory device in the predetermined communications architecture (e.g. the MIPI UniPro communications architecture) with aid of flexible delay time control according to an embodiment of the present invention.

In Step S10, the memory device 100 (e.g. the memory controller 110 therein) can determine the communications speed SPEED, such as the aforementioned selected communications speed among the multiple predetermined communications speeds. For example, the multiple predetermined communications speeds may represent the communications speeds of the multiple predetermined communications speed modes, respectively, and the selected communications speed may represent the communications speed of the selected communications speed mode among the multiple predetermined communications speed modes, where the selected communications speed mode is selected from the multiple predetermined communications speed modes.

In Step S11, the memory device 100 (e.g. the memory controller 110 therein) can utilize the at least one upper layer controller such as the U controller 118U to dynamically set the delay parameter regarding transmission from the memory device 100 to the host device 50, such as the EoB delay parameter EoB_Delay(SPEED), and more particularly, dynamically set the delay parameter such as the EoB delay parameter EoB_Delay(SPEED) according to the communications speed SPEED (e.g. the selected communications speed among the multiple predetermined communications speeds), for preventing sleeping in at least one delay time DT corresponding to the delay parameter (e.g. the predetermined delay time corresponding to the EoB delay parameter EoB_Delay(SPEED)), where the delay parameter is dynamically set as one of multiple predetermined values (e.g. EoB_Delay(SPEED)=100, 200, 400, 800 or 1600), rather than being set as a single fixed value.

For better comprehension, the aforementioned at least one delay time DT such as one or more delay times {DT} may comprise a delay time DT(i), where the index i may represent a non-negative integer, but the present invention is not limited thereto. The index i may have an initial value such as zero (labeled "i=0" for brevity), and may increase with an increment such as one (labeled "i++" for brevity).

In Step S12, the memory device 100 (e.g. the memory controller 110 therein) can utilize the PHY circuit such as the M-PHY circuit 118M to transmit the data DATA(i) (e.g. the data DATA(0), if i=0) from the memory device 100 to the host device 50, where the delay time DT(i) (e.g. the delay time DT(0), if i=0) measured with respect to the data DATA(i) among the aforementioned at least one delay time DT such as the one or more delay times {DT} starts from a time point t(i) (e.g. the time point t(0), if i=0) at which transmitting the data DATA(i) (e.g. the data DATA(0), if i=0) from the memory device 100 to the host device 50 is completed.

In Step S13, according to the busy signal BUSY, the memory device 100 (e.g. the memory controller 110 therein) can check whether any component of the multiple predetermined components within the memory controller 110 is busy or in the busy state. If Yes (e.g. the busy signal BUSY indicates that the aforementioned at least one component among the multiple predetermined components is in the busy state), Step S14 is entered; if No, Step S15 is entered. For better comprehension, the any component such as the aforementioned at least one component being busy or being in the busy state may represent that it is needed to transmit more information such as more data, one or more responses, etc. from the memory device 100 to the host device 50 via the PHY circuit such as the M-PHY circuit 118M.

In Step S14, when the busy signal BUSY indicates that the any component such as the aforementioned at least one component among the multiple predetermined components is in the busy state or in the busy state, the memory device 100 (e.g. the memory controller 110 therein) can postpone the delay of the burst close until the busy signal BUSY indicates that none of the multiple predetermined components is busy or in the busy state, where postponing the delay of the burst close can make the delay time DT(i) (e.g. the delay time DT(0), if i=0) starting from the time point t(i) (e.g. the time point t(0), if i=0) be extended. For example, the memory device 100 (e.g. the memory controller 110 therein) can control the counter CNT to temporarily stop counting (e.g. temporarily stop performing count down) according to the busy signal BUSY, to postpone the delay of the burst close until the busy signal BUSY indicates that none of the multiple predetermined components is busy or in the busy state. Thus, postponing the delay of the burst close can be implemented by controlling the counter CNT to temporarily stop counting.

In Step S15, the memory device 100 (e.g. the memory controller 110 therein) can check whether the data DATA (i+1) (e.g. the data DATA(1), if i=0) is ready (e.g. ready for being transmitted by the transmitter 118MT) within the delay time DT(i) corresponding to the delay parameter. If Yes, Step S16 is entered; if No, Step S17 is entered.

In Step S16, the memory device 100 (e.g. the memory controller 110 therein) can utilize the PHY circuit such as the M-PHY circuit 118M to start transmitting the data DATA (i+1) (e.g. the data DATA(1), if i=0) from the memory device 100 to the host device 50 in the delay time DT(i) (e.g. the delay time DT(0), if i=0) without restarting from sleeping.

In Step S17, the memory device 100 (e.g. the memory controller 110 therein) can sleep (e.g. enter a sleep state) to save power, and more particularly, turn off the power of some components (e.g. the PHY circuit such as the M-PHY circuit 118M) within the memory controller 110, and afterward, restart from sleeping, for example, in response to a host command from the host device 50, but the present invention is not limited thereto.

In Step S18, the memory device 100 (e.g. the memory controller 110 therein) can check whether there is more data to be transmitted. If Yes, Step S16 is entered; if No, Step S13 is entered.

In Step S19, the memory device 100 (e.g. the memory controller 110 therein) can check whether to change the communications speed SPEED. If Yes, Step S10 is entered; if No, Step S12 is entered.

Under control of the memory controller 110, the delay parameter such as the EoB delay parameter EoB_Delay (SPEED) is adjustable with respect to the communications speed SPEED between the host device 50 and the memory device 100. In at least one loop comprising Steps S10, S11, etc. shown in FIG. 5, the memory controller 110 can dynamically adjusts the delay parameter such as the EoB delay parameter EoB_Delay(SPEED) according to the communications speed SPEED in response to any variation of the communications speed SPEED, and more particularly, perform dynamic settings of the EoB delay parameter EoB_Delay(SPEED) (e.g. EoB_Delay(SPEED)=100, 200, 400, 800 or 1600) for different configurations among the set of predetermined configurations regarding the transmission interface circuit 118, to make the at least one delay time DT corresponding to the EoB delay parameter EoB_Delay (SPEED) be equal to the predetermined absolute time length (e.g. 10 μs). As a result, for the set of predetermined configurations, the delay parameter can be dynamically set as the multiple predetermined values, respectively, rather than being set as the single fixed value.

In addition, the memory device 100 (e.g. the memory controller 110 therein) can utilize the counter CNT to count the counter value related to the at least one delay time DT according to the delay parameter such as the EoB delay parameter EoB_Delay(SPEED). For example, the counter CNT can be arranged to perform the count down operations mentioned above, starting from the predetermined initial counter value (e.g. a value of the EoB delay parameter EoB_Delay(SPEED)). In response to the counter value reaching zero, the at least one upper layer controller such as the U controller 118U can control the transmitter 118MT to stop transmission, but the present invention is not limited thereto. For brevity, similar descriptions for this embodiment are not repeated in detail here.

For better comprehension, the method may be illustrated with the working flow shown in FIG. 5, but the present invention is not limited thereto. According to some embodiments, one or more steps may be added, deleted, or changed in the working flow shown in FIG. 5.

Figure 6:
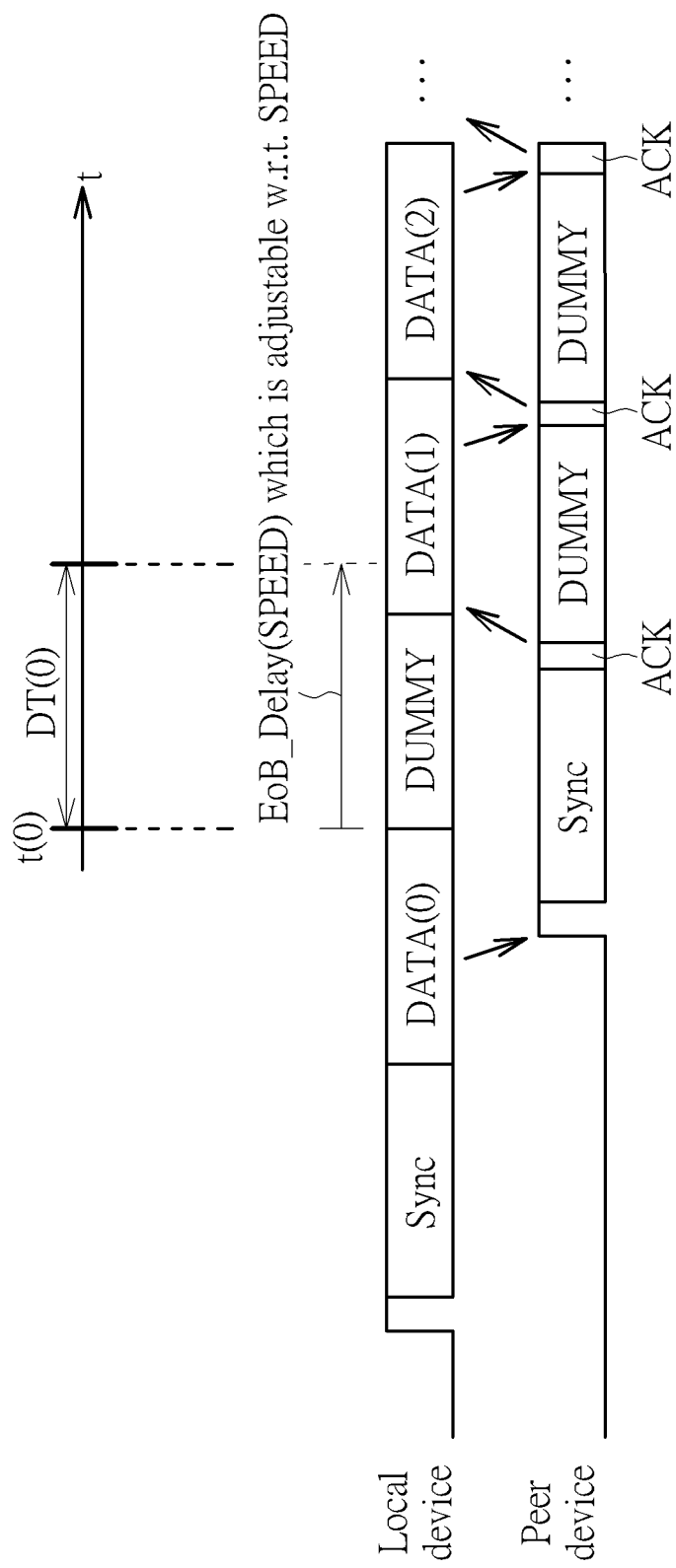
FIG. 6 illustrates some implementation details of the flexible delay control scheme shown in FIG. 4 according to an embodiment of the present invention.

FIG. 6 illustrates some implementation details of the flexible delay control scheme shown in FIG. 4 according to an embodiment of the present invention, where the horizontal axis shown in the uppermost of FIG. 6 may represent time (labeled "t" for brevity). For the case of i=0, the memory device 100 (e.g. the memory controller 110 therein) can perform the following operations:

(1) utilizing the M-PHY circuit 118M to transmit the data DATA(0) from the memory device 100 to the host device 50, where the delay time DT(0) measured with respect to the data DATA(0) starts from the time point t(0) at which transmitting the data DATA(0) from the memory device 100 to the host device 50 is completed;

(2) checking whether the data DATA(1) is ready (e.g. ready for being transmitted by the transmitter 118MT) within the delay time DT(1) corresponding to the delay parameter (e.g. the EoB delay parameter EoB_Delay(SPEED)); and (3) utilizing the M-PHY circuit 118M to start transmitting the data DATA(1) from the memory device 100 to the host device 50 in the delay time DT(0) without restarting from sleeping, but the present invention is not limited thereto. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management of a memory device in a predetermined communications architecture with aid of flexible delay time control, the method being applied to a memory controller of the memory device, the memory device comprising the memory controller and a non-volatile (NV) memory, the NV memory comprising at least one NV memory element, the method comprising:

utilizing at least one upper layer controller of a transmission interface circuit within the memory controller to dynamically set a delay parameter regarding transmission from the memory device to a host device, for preventing sleeping in at least one delay time corresponding to the delay parameter, wherein the delay parameter is dynamically set as one of multiple predetermined values, rather than being set as a single fixed value;

utilizing a physical layer (PHY) circuit of the transmission interface circuit to transmit first data from the memory device to the host device, wherein a first delay time measured with respect to the first data among the at least one delay time starts from a first time point at which transmitting the first data from the memory device to the host device is completed; and utilizing the PHY circuit to start transmitting second data from the memory device to the host device in the first delay time without restarting from sleeping.

2. The method of claim 1, wherein the step of utilizing the at least one upper layer controller of the transmission interface circuit to dynamically set the delay parameter regarding the transmission from the memory device to the host device further comprises:
  utilizing the at least one upper layer controller to dynamically set the delay parameter according to a selected communications speed among multiple predetermined communications speeds, wherein the selected communications speed is selected from the multiple predetermined communications speeds.

3. The method of claim 2, wherein the multiple predetermined communications speeds represent communications speeds of multiple predetermined communications speed modes, respectively, and the selected communications speed represents a communications speed of a selected communications speed mode among the multiple predetermined communications speed modes.

4. The method of claim 1, wherein under control of the memory controller, the delay parameter is adjustable with respect to a communications speed between the host device and the memory device.

5. The method of claim 4, wherein the memory controller dynamically adjusts the delay parameter according to the communications speed in response to any variation of the communications speed.

6. The method of claim 1, wherein the at least one upper layer controller comprises a counter; and the method further comprises:
  utilizing the counter to count a counter value related to the at least one delay time according to the delay parameter.

7. The method of claim 6, wherein the counter is arranged to perform count down operations, starting from a predetermined initial counter value; and in response to the counter value reaching zero, the at least one upper layer controller controls a transmitter in the PHY circuit to stop transmission.

8. The method of claim 7, wherein the delay parameter represents an end-of-burst (EoB) delay parameter, and the predetermined initial counter value represents a value of the EoB delay parameter.

9. The method of claim 1, wherein the delay parameter represents an end-of-burst (EoB) delay parameter.

10. The method of claim 9, wherein the memory controller is arranged to perform dynamic settings of the EoB delay parameter to make the at least one delay time corresponding to the EoB delay parameter be equal to a predetermined absolute time length.

11. The method of claim 10, wherein the memory controller is arranged to perform the dynamic settings of the EoB delay parameter for different configurations among a set of predetermined configurations regarding the transmission interface circuit to make the at least one delay time corresponding to the EoB delay parameter be equal to the predetermined absolute time length.

12. The method of claim 1, wherein for a set of predetermined configurations regarding the transmission interface circuit, the delay parameter is dynamically set as the multiple predetermined values, respectively, rather than being set as the single fixed value.

13. The method of claim 1, wherein the memory controller further comprises a busy detection circuit arranged to generate a busy signal; and in response to the busy signal indicating that at least one component among multiple predetermined components within the memory controller is in a busy state, the memory controller is arranged to postpone a delay of burst close until the busy signal indicates that none of the multiple predetermined components is in the busy state, wherein postponing the delay of the burst close makes the first delay time starting from the first time point be extended.

14. The method of claim 13, wherein the at least one upper layer controller comprises a counter, and the counter is arranged to count a counter value related to the at least one delay time according to the delay parameter; and postponing the delay of the burst close comprises controlling the counter to temporarily stop counting.

15. The method of claim 13, wherein the at least one component being in the busy state represents that it is needed to transmit more information from the memory device to the host device via the PHY circuit.

16. A memory device, comprising:
  a non-volatile (NV) memory, arranged to store information, wherein the NV memory comprises at least one NV memory element; and
  a controller, coupled to the NV memory, arranged to control operations of the memory device, wherein the controller comprises:
    a processing circuit, arranged to control the controller according to a plurality of host commands from a host device, to allow the host device to access the NV memory through the controller; and
    a transmission interface circuit, arranged to perform communications with the host device, wherein the transmission interface circuit comprises:
      a physical layer (PHY) circuit, arranged to perform transmitting and receiving operations for the transmission interface circuit; and
      at least one upper layer controller, arranged to control operations of the PHY circuit according to a predetermined specification;
  wherein:
    the controller utilizes the at least one upper layer controller to dynamically set a delay parameter regarding transmission from the memory device to the host device, for preventing sleeping in at least one delay time corresponding to the delay parameter, wherein the delay parameter is dynamically set as one of multiple predetermined values, rather than being set as a single fixed value;
    the controller utilizes the PHY circuit to transmit first data from the memory device to the host device, wherein a first delay time measured with respect to the first data among the at least one delay time starts from a first time point at which transmitting the first data from the memory device to the host device is completed; and
    the controller utilizes the PHY circuit to start transmitting second data from the memory device to the host device in the first delay time without restarting from sleeping.

17. An electronic device comprising the memory device of claim 16, and further comprising:
  the host device, coupled to the memory device, wherein the host device comprises:
    at least one processor, arranged for controlling operations of the host device; and
    a power supply circuit, coupled to the at least one processor, arranged for providing power to the at least one processor and the memory device;
  wherein the memory device provides the host device with storage space.

18. A controller of a memory device, the memory device comprising the controller and a non-volatile (NV) memory, the NV memory comprising at least one NV memory element, the controller comprising:

a processing circuit, arranged to control the controller according to a plurality of host commands from a host device, to allow the host device to access the NV memory through the controller; and a transmission interface circuit, arranged to perform communications with the host device, wherein the transmission interface circuit comprises:

a physical layer (PHY) circuit, arranged to perform transmitting and receiving operations for the transmission interface circuit; and at least one upper layer controller arranged to control operations of the PHY circuit according to a predetermined specification;

wherein:

the controller utilizes the at least one upper layer controller to dynamically set a delay parameter regarding transmission from the memory device to the host device, for preventing sleeping in at least one delay time corresponding to the delay parameter, wherein the delay parameter is dynamically set as one of multiple predetermined values, rather than being set as a single fixed value;

the controller utilizes the PHY circuit to transmit first data from the memory device to the host device, wherein a first delay time measured with respect to the first data among the at least one delay time starts from a first time point at which transmitting the first data from the memory device to the host device is completed; and the controller utilizes the PHY circuit to start transmitting second data from the memory device to the host device in the first delay time without restarting from sleeping.

\* \* \* \* \*